United States Patent [19]

Jardinier et al.

[11] Patent Number: 4,460,122
[45] Date of Patent: Jul. 17, 1984

[54] PROCESS FOR REGULATING THE VENTILATION OF A BUILDING AND MEANS FOR ITS USE

[75] Inventors: Pierre Jardinier, Gournay s/Amarne; Jack Simonnot, Ozoire la Ferriere, both of France

[73] Assignee: Societe d'Etudes et de Recherches de Ventilation et d'Aerauliquesserva, Gournay S/Marne, France

[21] Appl. No.: 388,743

[22] Filed: Jun. 15, 1982

[30] Foreign Application Priority Data

Jun. 30, 1981 [FR] France ............................... 81 12857

[51] Int. Cl.³ .......................................... G05D 22/00
[52] U.S. Cl. ................. 236/44 A; 98/33 R; 165/21; 62/176.1
[58] Field of Search ............... 236/44 R, 44 A, 49; 165/21, 16; 62/176.1, 176.6; 98/32, 33 R

[56] References Cited

U.S. PATENT DOCUMENTS

| | | | |
|---|---|---|---|
| 2,016,091 | 10/1935 | Karlson | 236/44 A |
| 2,128,096 | 8/1938 | Loepsinger | 236/44 A |
| 2,163,692 | 6/1939 | Loepsinger | 236/44 A |
| 2,165,831 | 7/1939 | Aulsebrook | 236/44 R X |
| 2,287,268 | 6/1942 | Palmer | 236/44 A |
| 2,295,728 | 9/1942 | Gess | 236/44 R X |
| 2,500,693 | 3/1950 | Marshall | 236/44 A |
| 2,582,986 | 1/1952 | Haertel et al. | 236/44 R X |
| 3,913,344 | 10/1975 | Holloway et al. | 62/176.6 |

Primary Examiner—William E. Tapolcai
Attorney, Agent, or Firm—Browdy and Neimark

[57] ABSTRACT

A system for regulating the ventilation of a building works automatically to reduce heating and air conditioning in unoccupied rooms by making the output of air removed from each room or service area vary as a function of the amount of humidity in the flow of air leaving such service area, the overall delivery of air introduced to replace the air removed being the greatest in the service area the loosing air from which exhibits the greatest humidity. To control the flow of air to various service areas, suitable intake and exhaust openings, having valves therein, such as flap or butterfly valves are provided.

16 Claims, 8 Drawing Figures

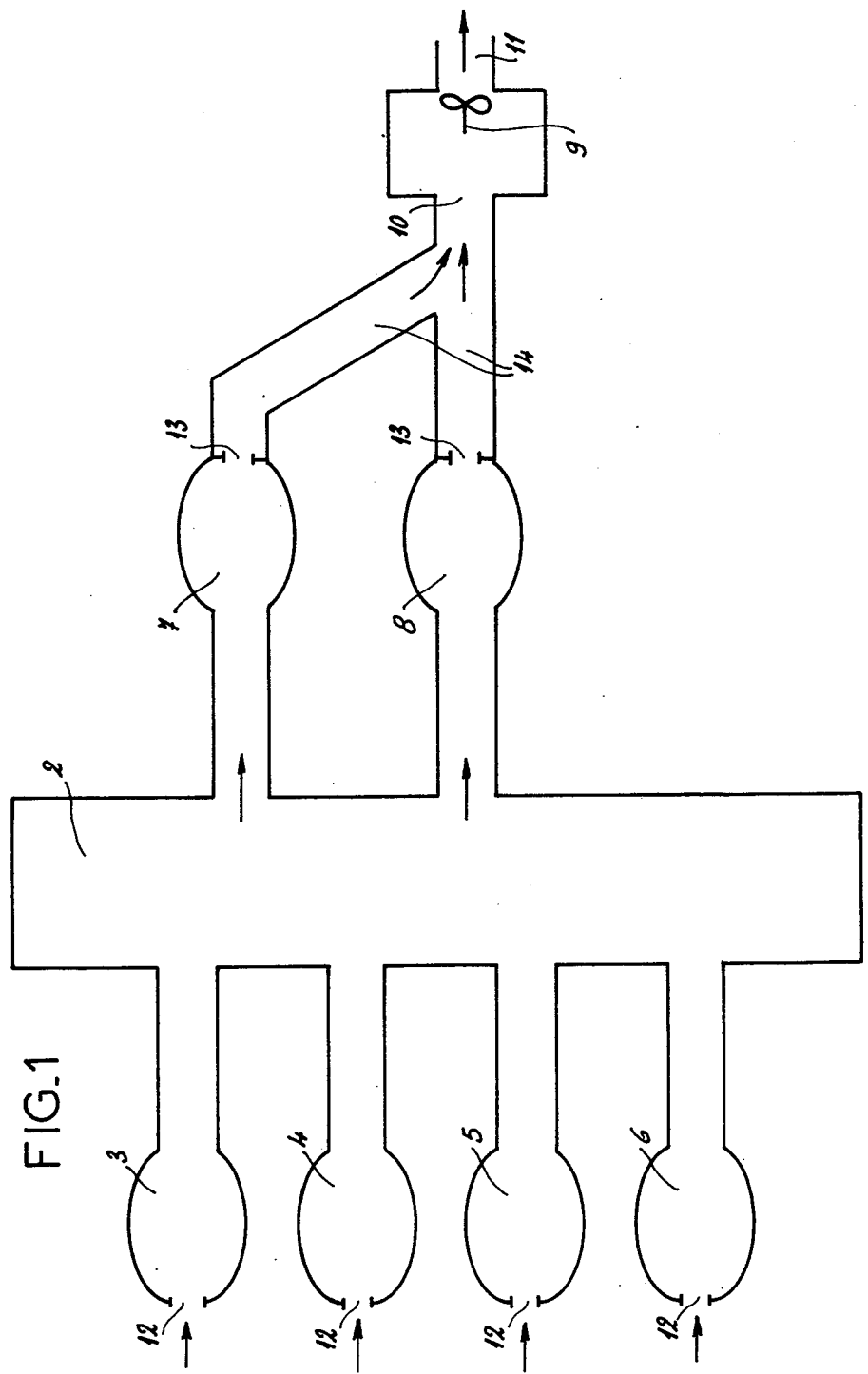

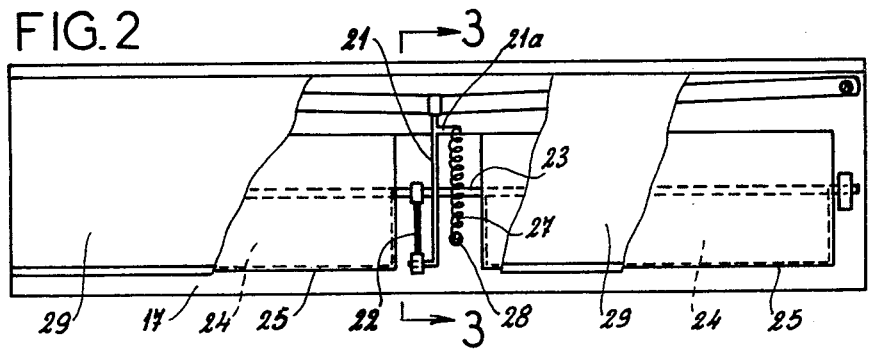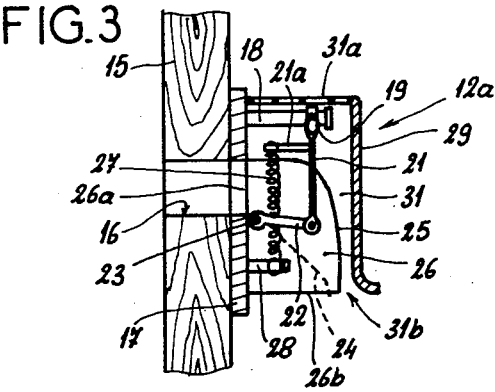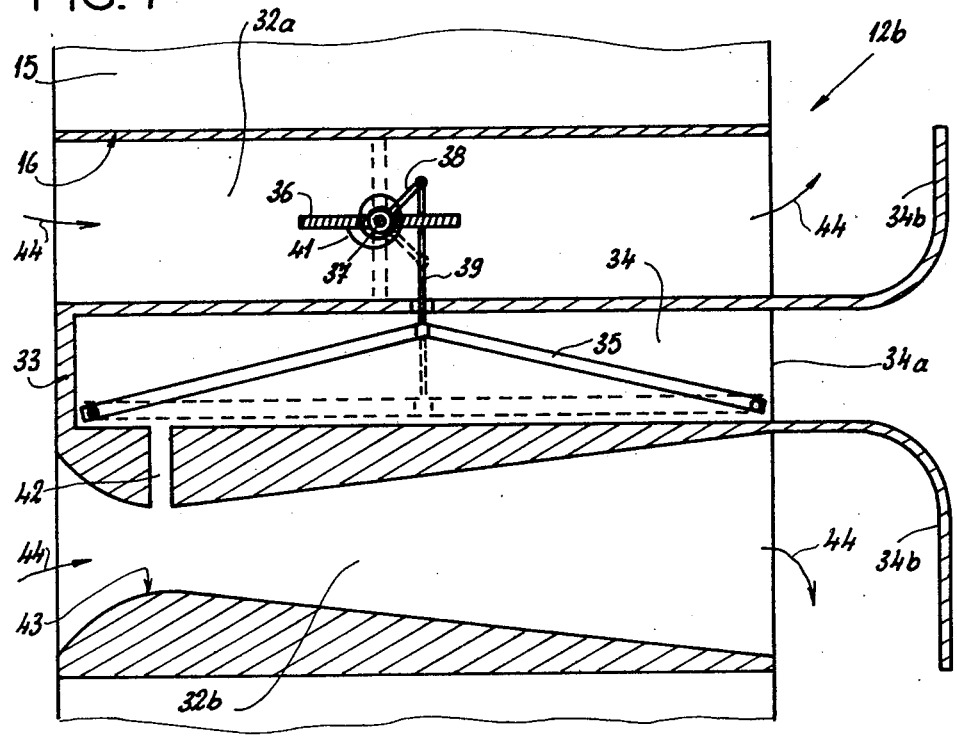

PROCESS FOR REGULATING THE VENTILATION OF A BUILDING AND MEANS FOR ITS USE

FIELD AND BACKGROUND

This invention relates to a process for regulating the ventilation of a building.

It is now common to install in buildings, especially when they are air conditioned, a forced ventilation system comprising a fan that assures the removal of stale air and air passage openings that constitute either stale air exhaust openings connecting certain rooms with the fan exhaust opening, or fresh air intake openings connecting the other rooms with the outside.

Some of these openings are fitted with means that make it possible to reduce their effective open area and, generally, these means are hand operated. Their purpose is to make it possible to discontinue ventilation in unoccupied rooms. Unfortunately, these means are used only in case of a long-term vacancy so that some rooms are unnecessarily ventilated and, consequently, there is an unnecessary consumption of energy both by ventilation and by heating or air conditioning.

SUMMARY OF THE INVENTION

The invention aims at remedying this drawback by making the regulation of the ventilation automatic. For this purpose, the process to which it relates is the type in which fresh air is introduced into living areas while stale air is removed from service areas, and consists, on the one hand, in making the output of air removed from each service area vary as a function of the amount of humidity in the flow of air removed from the service area under consideration and in the same direction as this amount and, on the other hand, to distribute, among the living spaces, the overall delivery of air introduced to replace the air removed as a function of the amount of humidity in the air contained in these spaces so that the delivery of air introduced is the greatest in the room or rooms whose air exhibits the greatest amount of humidity.

Thus, with the amount of humidity varying as a function of the use of the service areas and as a function of the occupation of the living areas, the ventilation will be well regulated as a function of the requirements of the moment.

In the installation embodying this process which is of said type in which each air passage opening is fitted with a means for regulating its open section, a hygrometer is associated with each opening and the means for regulating its open section is controlled by this hygrometer in such a way that said section varies in the same direction as the amount of humidity which prevails in the room under consideration.

Generally, the element sensitive to humidity of the hygrometer associated with each air passage opening, whether it is an intake or exhaust opening, is located in a position subject to the same hygrothermal conditions as the room for which it controls the ventilation.

According to a simple embodiment of the invention, the means for regulating the open section of an air passage opening consists of a flap or butterfly valve in an articulation shaft to which is keyed a lever connected, by a rod or the like, to the element sensitive to humidity in the associated hygrometer, spring means being provided to constantly act, directly or not, on said flap or butterfly valve to hold it in its position corresponding to the maximum valve of the open section of the opening under consideration.

According to another embodiment of this opening, the means for regulating its open section comprises a flexible and elastic strip whose bending depends on the amount of controlled humidity.

In the case where this opening is an air intake opening, the element sensitive to humidity in the associated hygrometer is placed beyond the reach of the flow of fresh drawn air. For example, it is located inside the room under consideration and outside the opening.

According to an improved embodiment of this intake opening, there is provided an auxiliary duct whose intake opening is turned toward the inside of the room under consideration, and whose outlet opening is placed in such a way that the flow of fresh air drawn into the room causes a partial vacuum adopted to draw the stale air of this room into this auxiliary duct and, on the other hand, the element sensitive to humidity is placed in this auxiliary duct.

For example, the element sensitive to humidity to the hygrometer is placed on the exterior wall of the opening and it is covered by a hood which delimits an auxiliary duct whose intake opening is directly connected to the room under consideration and whose outlet opening is adjacent to that of the main duct through which the flow of fresh air passes and which is fitted with a flap for regulating its open section.

According to yet another embodiment of this opening, the element sensitive to humidity is placed in a compartment forming an auxiliary canal, of which one end is directly connected with the corresponding room and whose other end is connected, by a small cross-section passage forming a venturi, with an area of reduced section of the main duct of the opening.

According to another embodiment of this opening, the two ducts are adjacent and separated from one another by a stationary partition, at its outer end corresponding to the intake end of the main duct and at the outlet end of the auxiliary duct. The opening is fitted with a flexible strip of elastic material, such as spring steel, forming a flap for regulating the section of the main duct and a deflector for the auxiliary duct. In the auxiliary duct is placed a bimetallic strip sensitive to humidity whose free end is joined to the free end of said flexible strip so as to cause the open section of the main duct to vary in the same direction as the amount of humidity in the air which goes through the auxiliary duct.

In the case where this opening is an exhaust opening, the element sensitive to humidity of the hygrometer is placed in a duct through which the flow of stale air drawn by the fan passes.

According to a simple embodiment of this opening, the flap constituting the means for regulating the open section of this opening is a flexible strip of elastic material. There is also provided a bypass duct serving as the housing for the element sensitive to humidity, and a strap or the like connecting this element to the free end of said strip.

In another embodiment of this opening, the flexible strip constituting the means for regulating its open section is a bimetallic strip sensitive to humidity and placed so as to cause this section to vary in the same direction as the amount of humidity in the flow of air which impinges upon it.

BRIEF DESCRIPTION OF THE DRAWINGS

In any case, the invention will be better understood from the description which follows in reference to the accompanying diagrammatic drawings that represent, by way of nonlimiting example, some embodiments of a system embodying the invention:

FIG. 1 diagrammatically illustrates ventilation system in an apartment having three bedrooms, a living room, a kitchen and a bathroom;

FIG. 2 is a side view in elevation of an air intake opening;

FIG. 3 is a view in section along line 3—3 of FIG. 2;

FIGS. 4 and 5 are views similar to FIG. 3 showing two other embodiments of air intake openings of the system according to the invention;

DETAILED DESCRIPTION OF PREFERRED EMBODIMENTS

Figure 5:
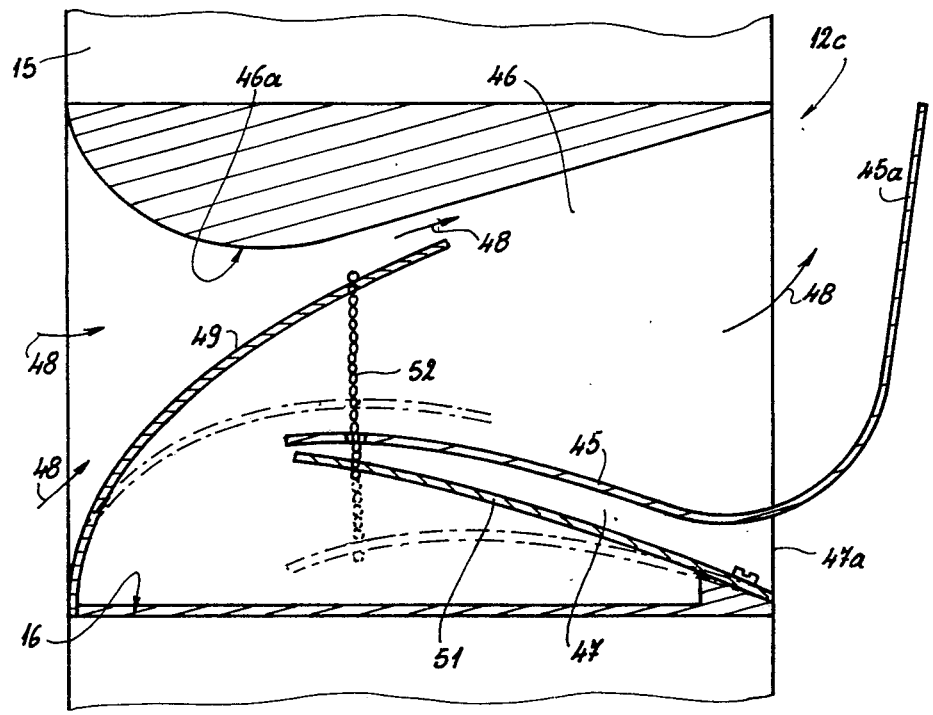

FIG. 1 shows an apartment comprising a hall 2 that makes access possible to three bedrooms 3,4,5, a living room 6, a kitchen 7 and a bathroom 8. The ventilation system of the invention is of the known type having a fan 9 located in the vicinity of oulet end 11 of the ventilation ducts, and air intake openings 12 connecting the living areas, i.e., bedrooms 3,4,5 and living room 6 directly with the outside. Air exhaust openings 13 connect the service areas, i.e., the kitchen and bathroom, with exhaust opening of fan 9 through ducts 14.

In such systems, the maximum deliveries are selected so as to be sufficiently high to supply simultaneously the maximum needs of each room as if they were permanently occupied by two individuals. This results in an excessive consumption of energy.

In some of these systems, the intake and exhaust openings are fitted with hand-operated means for closing them, which obviously would make it possible to reduce unnecessary energy consumption by cutting off the ventilation in the unoccupied rooms, but unfortunately, it is not often that the user makes use of the presence of these means for closing to make such energy savings.

Furthermore, on the circuit there can be a partially clogged air intake at the level of the anti-mosquito screen with which it is possibly fitted, which will cause a decrease in the delivery of this bedroom up to a point at which degradations can occur. It should be noted that this decrease of delivery in this room will not change the overall delivery of exhausted air which will simply be distributed differently by increasing in the other rooms.

There can also be an undesirable air intake in a bedroom which increases its delivery by decreasing that of the other rooms. A similar undesirable intake can also occur in the hall or in the kitchen, which will have the effect of decreasing all the deliveries of the living areas.

The process of the invention consists in regulating the ventilation as a function of the amount of humidity prevailing in the room under consideration by modification of the open section of the corresponding intake or exhaust opening and, consequently, by increasing or decreasing the pressure losses created in this opening.

It is known that the amount of humidity in the air of a bedroom 3, 4 or 5 depends:
- on the temperature of the outside air and on its amount of humidity,
- on the inside temperature,
- on the presence of occupants where each one produces 50 grams of water per hour,
- and on the flow of air which passes through this bedroom.

It is also known that the humidity of a bath or shower room 8 where there is an exhaust opening 13 depends on the amount of humidity in the air which comes from bedrooms 3,4,5 and from living room 6, on the humidity possibly produced in this shower room and on the temperature of this room. Regulating the opening of the air intake and exhaust openings will therefore have the effect of furnishing a solution to the problems posed by the variation of all the aforementioned parameters.

Actually, as previously indicated, each intake opening 12 or exhaust opening 13 comprises adjustable means for closing and control means sensitive to the humidity of the air contained in the room under consideration, i.e., a hygrometer. Therefore, each intake opening 12 or exhaust opening 13 has its open section controlled by a hygrometer sensitive in the humidity of the air inside the room in which the opening under consideration is fitted.

Therefore, it is easily seen that in an empty apartment not producing vapor, all the intake and exhaust openings 12 and 13 are closed to the maximum, which makes it possible to save considerable energy, on the order of 70%, when it is very cold outside because then the amount of water contained per cubic meter of outside air is very slight.

On the other hand, when the outside temperature rises, the energy savings are less significant, but it must be noted that this drawback is inconsequential because the amount of energy to be supplied per cubic meter/hour is increasingly smaller. In fact, it is found that the amounts of energy to be supplied for heating the air become independent of the temperature difference between the outside and the inside. This offers a considerable advantage in electric heating with nuclear generation little able to be modulated. Actually, it is known that it is the peaks of winter consumption that pose the most problems for the electric power authorities.

Therefore, it is as a function of the needs of each room of the apartment that the intake or exhaust openings 12 or 13 are opened or are closed.

For example, in an apartment such as the one illustrated in FIG. 1 that has three bedrooms and and a living room in which each one is occupied by a couple, or a total of eight individuals, the results illustrated by the table which follows in which the three bedrooms and the living room are designated by BR3, BR4, BR5 and LR6 can be obtained:

|  | BR3 | BR4 | BR5 | LR6 |
| --- | --- | --- | --- | --- |
| Temperature selected | 15 | 17 | 19 | 21 in °C. |
| Ventilation delivery With an outside temperature of −7° C. | 21 | 19 | 17 | 16 in m$^3$/h |

The measurements made under such conditions on the consumption of energy have made it possible to demonstrate that with respect to a traditional system operating under the same conditions as those illustrated in the above table, the system according to the invention would make possible an energy savings on the order of 38%.

With such a system, an incident such as the one mentioned above of the clogging of an anti-mosquito screen will be at least partially offset, at least as long as the screen is not completely clogged, by the fact that corresponding air intake opening 12 will have its open section regulating means shifted in their position corresponding to the largest open section.

On the other hand, any undesirable extra opening in any place in the apartment will have its effect diminished because air intake opening 12 closest to this undesirable intake will have its means for regulating its open section shifted in the direction of a decrease in this section. Therefore, there will be no consequences in the room under consideration nor in th other rooms by automatic compensation for the extra opening.

Therefore, it is easily seen that the process of the invention exhibits not only energy saving advantages, but it also has the effect of making all the rooms of the apartment independent.

Finally, it should be noted that the additional cost of this system in relation to a traditional system is low, which makes this system particularly advantageous.

FIGS. 2 to 5 illustrate three embodiments of air intake openings, such as those installed in bedrooms 3,4,5 and living room 6. Therefore, these openings are designed to regulate the introduction of outside fresh air into the corresponding room according to the amount of humidity in the air that prevails in this room. Consequently, the measurement of this amount of humidity must be made separate from the flow of fresh air that enters into the opening. Furthermore, it is necessary that the hygrometer associated with this opening be contacted by an airflow supplied by air from the room under consideration, in addition in the opening under consideration there has to be provided at least a main duct that serves as the passage for the flow of fresh air, an auxiliary duct in which only air coming from the inside of this room circulates.

Actually, it is easily seen that if the hygrometer is in contact only with the air that fills the room under consideration without there being any circulation, the measurement of the amount of humidity in it would be distorted.

In the embodiment illustrated in FIGS. 2 and 3, air intake opening 12a is bracketed on the inner face of wall 15 that separates the room under consideration from the outside. A hole 16 cut in the wall 15 connects the room under consideration with the outside. On a plate 17 forming the base of opening 12a is attached a hygrometer 18 of known type, consisting of a braid 19 whose length increases with the amount of humidity and which, in the absence of humidity, is stretched between these two supports. A rod 21 hanging on braid 19 approximately at its midpoint is hinged at the free end of a lever 22 whose other end is keyed on shaft 23 of a closing flap 24. A casing 25 delimits, with base 17, an air intake duct 26 in which one end 26a coincides with slot 16 and whose other end 26b is directed downward. The operation of shaft 23 makes it possible to cause flap 24 to pivot between a position of total closure of duct 26 and a position of total opening of this duct. In the position illustrated in FIG. 3, duct 26 is almost totally closed by flap 24.

A spring, one end of which is secured at stationary point 28 solid with plate 17 and whose other end is secured to an arm 21a solid with rod 21, constantly tends to pivot flap 24 to the position of total opening of duct 26, and this position can be obtained when braid 19 of hygrometer 18 is distended by the humidity in the air which surrounds it. On the other hand, when braid 19 is in a very dry environment, its tension pulls back flap 24 into a position of total closure against the return force of spring 27.

A hood 29 held by plate 17 covers the unit of this apparatus so as to provide between casing 25 and itself an auxiliary duct 31 whose intake opening consists of grill 31a formed in the upper horizontal wall of hood 29 and whose outlet opening 31b surrounds outlet opening 26b of main duct 26.

It is easily seen that the flow of fresh air that passes through duct 26 creates at the level of outlet 26b of this duct a partial vacuum which creates in auxiliary canal 31 obviously comes from the interior of the room under consideration and braid 19 of hygrometer 18 contacted by this flow of air is thus in good contact with the air that fills this room.

Consequently, when several individuals occupy this room and the amount of humidity in the air which fills it increases, braid 19 of hygrometer 18 becomes distended and under the action of spring 27 flap 24 is pivoted in the direction of an increase in the open section of duct 26.

In the example illustrated in the drawing and like that coming from FIG. 2, two slots 16 and two flaps 24 keyed to the same shaft 23 are provided, but it is obvious that a single slot 16 or more than two slots could just as well have been provided.

This type of air intake opening intended to be bracketed is more specially suited to outer walls of slight thickness and particularly to windows in which slots corresponding to air intake ducts 26 are provided. On the contrary, when an air intake opening is intended to be used with a thick outer wall, an embodiment of this opening that could be incorporated into a thick wall can be provided. FIGS. 4 and 5 illustrate two variant embodiments of such air intake openings incorporated into thick outer wall.

In the example illustrated in FIG. 4, air intake opening 12b is incorporated into wall 15, i.e., it is housed almost entirely in hole 16 provided in this wall 15 and whose perimeter it fits. The main duct of this opening 12b is divided into two parallel parts 32a and 32b, respectively, separated from each other by a box 33 that delimits an auxiliary duct 34 in which is housed braid 35, i.e. the element sensitive to humidity of a hygrometer.

Only part 32a of main duct 32 is fitted with a means for closing which, in this example, consists of a butterfly valve 36 keyed to a shaft 37 on which is also keyed a lever 38 at the free end of which is connected a rod 39 whose other end is secured approximately at the mid point of braid 35. A coil spring 41 tends constantly to bring butterfly valve 36 into the fully open position in duct 32a, as illustrated in the figure. It is easily seen that this spring tends to keep braid 35 taut and that consequently the opening of duct 32a goes in the same direction as the amount of humidity which contacts braid 35.

A passage 42 connects auxiliary duct 34 with part 32b of the main duct, i.e., the one which is never closed off. This passage 42 opens into duct 32b to the right of a constriction intentionally provided in part 32b of the main duct, so as to cause a venturi effect by which the air is drawn into auxiliary duct 34 through passage 42 when the current of fresh air goes through parts 32a and 32b of the main duct in the direction indicated by arrows 44. As the drawing shows, intake end 34a of auxiliary duct 34 is surrounded by the outlet ends of parts 32a and 32b of the main duct of this opening. To prevent fresh air from being immediately drawn into auxiliary duct 34, end 34a of auxiliary duct 34 is extended by a flat shield 34b that acts as a deflector and that keeps away from intake opening 34a of this auxiliary duct 34, the flow of fresh air leaving parts 32a and 32b of the main duct.

Thus, a control of the open section of part 32a of the main duct is obtained through which is admitted a portion of the flow of fresh air as a function of the amount of humidity in the air contained in the corresponding room since it is solely the air contained in this room which is drawn into auxiliary duct 34 and which contacts braid 35, i.e. the element sensitive to humidity of the hygrometer associated with this opening 12b.

FIG. 5 shows a variant embodiment of an air intake opening of the type intended to be incorporated into a thick outer wall 15, i.e., to be housed entirely or almost entirely in hole 16 provided in this wall to receive it.

In this example, the open section opening 12c is divided into two parts by a partition 45 that delimits a main duct 46 and a secondary duct 47, and that is extended to the outside of wall 15 from the edge of the inner face of the latter to form a deflector 45a which has the effect of deflecting, as illustrated by arrows 48, the flow of fresh air coming from the outside of intake opening 47a of auxiliary duct 47. A flexible and elastic strip 49 is attached in the vicinity of the inlet end of this opening 12c so as to constitute a total or partial closure flap of main duct 46. The elasticity of the strip constituting this flap 49 tends normally to bring it into a position of total closure of duct 46.

At the other end of this opening 12c is attached a bimetallic strip 51 sensitive to humidity and which is placed entirely inside auxiliary duct 47. The free ends of flexible strip 49 and bimetallic strip 51 are connected to each other by a flexible strap or the like 52.

As shown in FIG. 5, the flow of fresh air drawn into opening 12c is throttled between flap 49 and the wall located opposite duct 46 which intentionally includes a constriction 46a. This flow of fresh air illustrated by arrows 48 creates, downstream from the free edge of flexible strip 49, a partial vacuum which tends to draw, through auxiliary canal 47, air contained in the corresponding room, deflector 45a having the effect of preventing fresh air from being drawn directly into auxiliary duct 47.

It can easily be seen that this results in a contacting of the bimetallic strip sensitive to humidity 51 by the air contained in the room, so that when it is subjected to rising humidity, this bimetallic strip 51 is bent and tends to increase the open section of main duct 46 by entraining with it flexible strip 49 as illustrated by dotted lines in the figure.

This air intake opening therefore exhibits approximately the same operating characteristics as those illustrated by the device of FIG. 4.

It can be noted in passing that the three air intake openings 12a, 12b and 12c which have just been described operate without any supply of energy.

Figure 6:
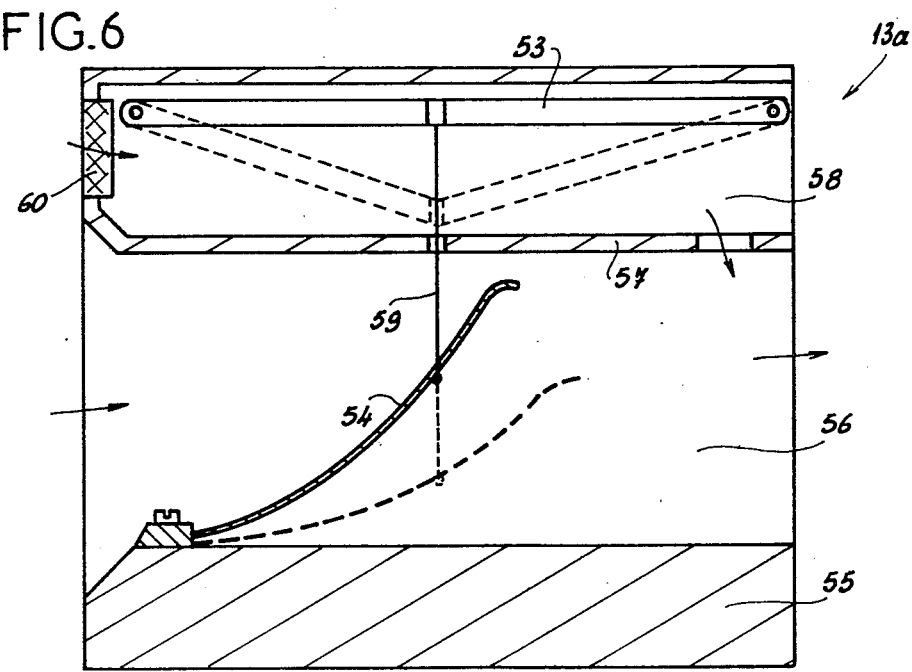
FIG. 6 shows, in a view in axial section, an air exhaust opening in a system according to the invention.
Figure 7:
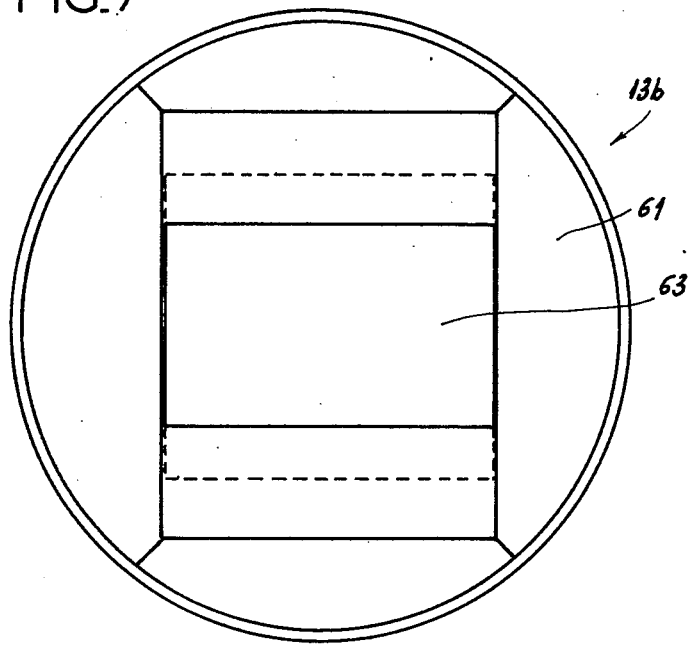
FIG. 7 is a side view in elevation of a variant embodiment of an air exhaust opening of a system according to the invention.
Figure 8:
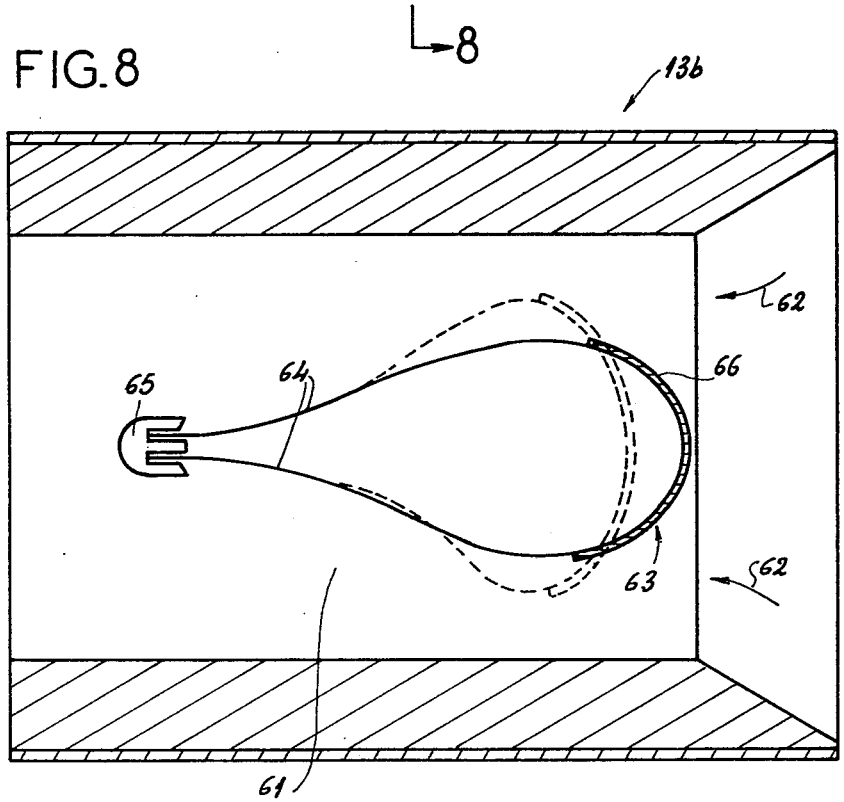
FIG. 8 is a view in section along line 8—8 of FIG. 7.

FIGS. 6 to 8 illustrate two variant embodiments of air exhaust openings, that is, two openings intended to be placed in service areas and therefore through which a flow of stale air passes. The element sensitive to humidity of the hygrometer which is associated with them must therefore be contacted by the flow of stale air in such a way that it is not necessary to provide a vacuum between two flows in these openings, as was the case with air intake openings 12a, 12b and 12c previously described.

In the example illustrated in FIG. 6, the hygrometer associated with opening 13a is of the type with braid 53 sensitive to humidity and the means for closing this opening consist of a flexible and elastic strip 54. Inside of body 55 of this opening is provided a main duct 56 whose open section can be modified by the more or less pronounced bending of flexible strip 54. A partition 57 defines an auxiliary duct 58 in which is housed braid 53 of the hygrometer and whose free section is independent of the position of flap 54.

The free end of flap 54 is connected by a rod or the like 59 at the midpoint of braid 53.

It is easily seen that the more the amount of humidity in the stale air exhausted through this opening increases, the more the flexible strip acting as flap 54 tends to unbend, that is to increase the open section of main duct 56, and that inversely, when the amount of humidity in the stale air exhausted through this opening decreases, the tension of braid 53 tends to bend flexible strip 54 so as to decrease the open section of duct 56.

The fact of placing braid 53 of the hygrometer in an auxiliary duct has not only the effect of keeping its operation independent of the delivery of stale air which goes through main duct 56 but also of making it possible to protect this braid 53 better from dust and other impurities which could insulate it from the humidity to which it is subjected, thanks particularly to a filter 60 which is fitted in the intake of this auxiliary duct 58.

In exhaust opening 13b illustrated in FIGS. 7 and 8, there is provided only a main duct 61 with a section approximately square through which the flow of stale air is exhausted, as illustrated by arrows 62.

Regulating means 63 for the passage of exhausted air consists of a flexible strip 64 whose ends are brought together and gripped in jaws 65 so as to form a valve in the shape of a wing.

On the loop of flexible strip 64 is glued a film 66 of a material very sensitive to the relative humidity of the exhausted air and whose local stresses cause the warping of strip 64.

When the relative humidity of the exhausted air varies, the stresses of film 66 also vary, and the open section of duct 61 varies as well.

This exhaust opening 13b is particularly well suited to the exhaustion of stale air that does not contain greases capable of opposing the migrating of the water vapor toward film 66 or inversely.

This opening 13b is therefore particularly appropriate for the removal of stale air from shower rooms.

While the invention has been described in detail above, it is to be understood that this detailed description is by way of example only and the protection granted is to be limited only within the spirits of the invention and the scope of the following claims.

We claim:

1. Process for regulating the ventilation of a building in which fresh air is introduced into living areas while stale air is exhausted from at least one service area, comprising the steps of causing the delivery of air exhausted from said at least one service area to vary as a function of the amount of humidity in the flow of air exhausted from said service area, causing the amount of air exhausted to be in direct proportion to the humidity of the air exhausted, distributing among the living areas the overall delivery of air introduced to replace the air exhausted as a function of the amount of humidity of the air contained in said living areas and in such a way that the delivery of air introduced is greater in the area or areas in which the air exhibits the greatest amount of humidity, and providing adjustable air flow openings in each of said living areas, and controlling the operative size of each said adjustable air flow openings in each of said living areas in accordance with the humidity of that particular living area.

2. A system for regulating the ventilation of a building in which fresh air is introduced into at least two living areas while stale air is exhausted from at least one service area, comprising means to cause the amount of air exhausted from each service area to vary as a function of the amount of humidity in the flow of the air exhausted from each said service area and in direct proportion to said amount, means to cause a distribution among the living areas of the overall delivery of air introduced to replace the exhausted air as a function of the amount of humidity in the air contained in these living areas in such a way that the delivery of air introduced is greater in the living area or areas in which the air exhibits the greatest amount of humidity, a fan for exhausting stale air and air passage openings that may operate as either stale air exhaust openings connecting the service areas with the exhaust opening of the fan, or fresh air intake openings connecting the living areas with the outside, each air passage opening comprising means for regulating its open section, a hygrometer associated with each air passage opening, and said means for regulating its open section being controlled by said hygrometer so that said section varies in proportion to the amount of humidity in the room under consideration as measured by said hygrometer.

3. System according to claim 2, wherein the element sensitive to humidity of the hygrometer associated with each air passage opening, whether it is an intake or exhaust opening, is placed in a position subject to the same hygrothermal conditions as the room whose ventilation it controls.

4. System according to claim, 3 wherein the means for regulating the open section of an air passage opening consists of a valve on an articulation shaft to which is keyed to a lever connected, by a rod or the like, to the element sensitive to humidity of the associated hygrometer, spring means being provided to act constantly, on said valve and tending to hold it in its position corresponding to the maximum value of the open section of the opening under consideration.

5. System according to claim 3, wherein the means for regulating its open section consists of a flexible and elastic strip whose bending depends on the amount of humidity controlled.

6. System according to any one of claims 2 to 5, wherein the element sensitive to humidity of the hygrometer consists of a braid.

7. System according to any one of claims 2 to 5, wherein the element sensitive to humidity of the hygrometer consists of a bimetallic strip.

8. System according to any one of claims 2 to 5, wherein in the case where this opening is an air intake opening, the element sensitive to humidity of the associated hygrometer is placed beyond the reach of the flow of drawn fresh air.

9. System according to claim 8, wherein the element sensitive to humidity of the associated hygrometer is placed inside the room under consideration and outside of the opening.

10. System according to claim 8, wherein, on the one hand, there is provided an auxiliary duct whose intake opening is turned toward the interior of the room under consideration, and whose outlet opening is placed so that the flow of fresh air drawn into the room causes a partial vacuum suited to draw, into this auxiliary duct, the stale air of this room and, on the other hand, the element sensitive to humidity is placed inside this auxiliary duct.

11. System according to any one of claims 3 or 4, wherein the element sensitive to humidity of the hygrometer is placed on the exterior wall of the opening and it is covered by a hood which delimits an auxiliary duct whose intake opening is directly connected with the room under consideration and whose outlet opening is adjacent to that of the main duct through which the flow of fresh air passes and which is fitted with a flap for regulating its open section.

12. System according to claim 4 wherein the element sensitive to humidity is placed in a compartment that forms an auxiliary duct, of which one end is connected directly with the corresponding room and whose other end is connected, by a passage of a small section that forms a venturi, with an area of reduced section of the main duct of the opening.

13. System according to claim 5, wherein two main and auxiliary ducts are adjacent and separated from each other by a stationary partition, at its outer end corresponding to the intake end of the main duct and at the outlet end of auxiliary duct, the opening is fitted with a flexible strip of elastic material, such as spring steel forming a flap for regulating the section of the main duct and a deflector for the auxiliary duct and, in the auxiliary duct is placed a bimetallic strip sensitive to humidity and whose open end is attached to the free end of the flexible strip so as to cause the open section of the main duct to vary in the same direction as the amount of humidity in the air which passes through the auxiliary duct.

14. System according to either claims 3 or 5, wherein in the case where this opening is an exhaust opening, the element sensitive to humidity of the hygrometer is placed in a duct through which passes the flow of stale air drawn by the fan.

15. System according to either of claims 3 or 5, wherein a flap constituting the means for regulating the open section of this opening is flexible strip of elastic material and there is provided a bypass duct that is used as a housing for the element sensitive to humidity, whose intake is fitted with a filter and in which a filtered portion of the exhausted stale air passes, a strap or the like connecting this element to the free end of the strip.

16. System according either of claim 3 or 5, wherein a flexible strip that constitutes the means for regulating the open section of the duct through which the stale air is exhausted has its two free ends held by stationary jaws so as to give it the shape of a curved loop and on its part in the shape of a loop is attached, by glue or the like, a film very sensitive to the relative humidity of the exhausted air and impart to this part of the flexible sheet the properties of a bimetallic strip.

* * * * *